United States Patent
Koyanagi

(10) Patent No.: US 9,715,473 B2
(45) Date of Patent: Jul. 25, 2017

(54) HDMI APPARATUS OF HIGH-DEFINITION TV HAS SWITCHING CIRCUIT THAT OUTPUTS LOW-LEVEL/GROUND POTENTIAL TO SECOND PIN OF HDMI CONNECTOR IF A FIRST SIGNAL IS NOT OUTPUTTED

(71) Applicant: NEC Display Solutions, Ltd., Tokyo (JP)

(72) Inventor: Kazuyuki Koyanagi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 115 days.

(21) Appl. No.: 14/429,342

(22) PCT Filed: Sep. 24, 2013

(86) PCT No.: PCT/JP2013/075682
§ 371 (c)(1),
(2) Date: Mar. 18, 2015

(87) PCT Pub. No.: WO2014/050807
PCT Pub. Date: Apr. 3, 2014

(65) Prior Publication Data
US 2015/0234770 A1    Aug. 20, 2015

(30) Foreign Application Priority Data

Sep. 25, 2012    (JP) .................... PCT/JP2012/074555
Oct. 5, 2012    (TW) ............................ 101136805 A

(51) Int. Cl.
*G06F 3/00*    (2006.01)
*G06F 13/40*    (2006.01)
(Continued)

(52) U.S. Cl.
CPC ......... *G06F 13/4081* (2013.01); *G09G 5/006* (2013.01); *H04L 43/0811* (2013.01);
(Continued)

(58) Field of Classification Search
CPC ........................... G06F 13/4081; G09G 5/006
(Continued)

(56) References Cited

U.S. PATENT DOCUMENTS 8,294,307 B2 * 10/2012 Tsai ...................... G06F 1/266
                                                        307/150
8,896,157 B2 * 11/2014 Huang .................. H02H 3/00
                                                        307/11
(Continued)

FOREIGN PATENT DOCUMENTS

JP    2006-146048 A    6/2006
JP    2007-226251 A    9/2007
(Continued)

OTHER PUBLICATIONS

International Search Report (ISR) (PCT Form PCT/ISA/210), in PCT/JP2013/075682, dated Nov. 5, 2013.
(Continued)

*Primary Examiner* — Tammara Peyton
(74) *Attorney, Agent, or Firm* — McGinn IP Law Group, PLLC.

(57) ABSTRACT

This electronic device includes connector to which an external device is connected via a communication cable, controller, and output unit. Connector includes at least first and second pins. A predetermined voltage is supplied from the external device to the first pin. Controller includes a communication unit to which a signal is input from the external device via a pin other than the first and second pins of connector, and outputs, when the communication unit is in an activated state, a first signal indicating the activated state.
(Continued)

Output unit outputs, when the first signal has not been output, a detection signal indicating that a connection has not been established with the external device to the external device via the second pin.

20 Claims, 7 Drawing Sheets

(51) Int. Cl.
*G09G 5/00* (2006.01)
*H04L 12/26* (2006.01)
(52) U.S. Cl.
CPC ... *H04L 43/0817* (2013.01); *G09G 2330/022* (2013.01); *G09G 2370/12* (2013.01); *G09G 2370/22* (2013.01)
(58) Field of Classification Search
USPC .................................................. 710/301, 302
See application file for complete search history.

(56) References Cited

U.S. PATENT DOCUMENTS

| | | | |
|---|---|---|---|
| 9,329,672 B2* | 5/2016 | Du | ........................... G06F 3/00 |
| 2003/0214507 A1 | 11/2003 | Mawatari et al. | |
| 2007/0132315 A1 | 6/2007 | Wang et al. | |
| 2010/0128178 A1 | 5/2010 | Yun et al. | |
| 2011/0273805 A1 | 11/2011 | Nguyen | |
| 2013/0229221 A1* | 9/2013 | Pan | ................... G06F 15/17343 327/365 |

FOREIGN PATENT DOCUMENTS

| | | |
|---|---|---|
| JP | 2008-158595 A | 7/2008 |
| JP | 2009-043177 A | 2/2009 |
| JP | 2009-140365 A | 6/2009 |
| JP | 2009-171260 A | 7/2009 |
| JP | 2011-160377 A | 8/2011 |
| JP | 2011-166747 A | 8/2011 |
| JP | 2011-172146 A | 9/2011 |
| JP | 2011-239286 A | 11/2011 |
| JP | 2012-044311 A | 3/2012 |
| JP | 2012-161045 A | 8/2012 |
| TW | 200838290 A | 9/2008 |

OTHER PUBLICATIONS

Japanese Office Action dated Oct. 6, 2015 with an English translation thereof.
Extended European Search Report dated May 20, 2016.
Taiwanese Office Action dated May 11, 2015 with a partial English translation of Search Report.

* cited by examiner

HDMI APPARATUS OF HIGH-DEFINITION TV HAS SWITCHING CIRCUIT THAT OUTPUTS LOW-LEVEL/GROUND POTENTIAL TO SECOND PIN OF HDMI CONNECTOR IF A FIRST SIGNAL IS NOT OUTPUTTED

TECHNICAL FIELD

The present invention relates to a technology for enabling an external device to detect connection with an electronic device in a communication system in which the external device is connected to the electronic device via a signal cable.

BACKGROUND ART

In the communication system in which the external device and the electronic device are connected to each other via the signal cable, the electronic device receives a voltage from the external device to output a signal indicating connection with the external device. As a device of this type, for example, there is known a HDMI (High-Definition Multimedia Interface) device that includes an interface HDMI Standard.

The HDMI is a standard concerning a communication interface for transmitting a video/audio through a digital signal. In recent years, there have been provided various devices including interfaces compliant with the HDMI Standard.

The communication system based on the HDMI Standard includes a source device for outputting a HDMI signal, and a sink device for receiving the HDMI signal. The source device and the sink device are connected to each other via a HDMI cable (refer to Patent Literature 1).

The source device is, for example, a Blu-ray display player, a video camera, or a portable device. The sink device is, for example, a monitor or a projector such as a HD (High Definition) television.

In the aforementioned communication system, when the source device and the sink device are connected to each other via the HDMI cable, processing for transmitting the HDMI signal between the source device and the sink device is executed.

FIG. 1 illustrates an example of a HDMI signal transmission/reception sequence.

Referring to FIG. 1, first, the source device supplies a predetermined voltage (e.g., +5 V) to the sink device (step S100). The sink device that has received the voltage transmits a hot-plug detection signal to the source device (step S101).

The source device recognizes that it is connected to the sink device on the basis of the hot-plug detection signal from the sink device.

The source device that has received the hot-plug detection signal executes access to EDID (Extended Display Identification Data) information in the sink device (step S102). The sink device transmits the EDID information that it holds to the source device (step S103). The EDID information is a data set indicating information regarding the corresponding function or performance (specifically, format or resolution) of the sink device.

The source device recognizes the format or the resolution of a video/audio reproducible by the sink device on the basis of the EDID information acquired from the sink device, and transmits a video/audio signal, corresponding to the format or to the resolution, to the sink device by a TMDS (Transition Minimized Differential Signaling) method (step S104).

The sink device receives the TMDS signal from the source device (step S105). In addition to the TMDS signal, a clock signal and a control signal are supplied from the source device to the sink device. The sink device executes processing such as reproduction of the TMDS signal on the basis of the clock signal according to the control signal.

FIG. 2 illustrates a configuration example of the sink device.

Referring to FIG. 2, the sink device includes HDMI connector 101, memory 102, and HDMI receiver IC (integrated circuit) 103.

Memory 102 is a nonvolatile memory such as an EEPROM (Electrically Erasable Programmable Read-Only Memory), and stores the EDID information.

HDMI connector 101 is a standard-type connector having 19 pins. The 19-th pin is a pin for outputting the hot-plug detection signal. The voltage of +5 V from the source device is supplied to the 18-th pin.

The 18-th pin is connected to the 19-th pin via a resistive element. When the voltage of +5 V is supplied to the 18-th pin, current flows through the resistive element, and the hot-plug detection signal (+5 V) is output from the 19-th pin.

The 15-th and 16-th pins are pins for reading the EDID information stored in memory 102. The 15-th and 16-th pins are connected to memory 102 and HDMI receiver IC 103.

The TMDS signal, the clock signal, and the control signal from the source device are received by some of the remaining pins. HDMI receiver IC 103 executes reproduction processing of the TMDS signal on the basis of the clock signal according to the control signal.

FIG. 3 illustrates another configuration example of the sink device.

The sink device illustrated in FIG. 3 is configured such that memory 102 is removed from the sink device illustrated in FIG. 2 and HDMI receiver IC 103 stores EDID information 104.

In the sink device illustrated in FIG. 3, HDMI receiver IC 103 is accessed from the source device via the 15-th and 16-th pins, and outputs EDID information 104 that it holds from the 15-th and 16-th pins. Other operations are similar to those illustrated in FIG. 2.

Both the sink devices illustrated in FIGS. 2 and 3 output, irrespective of whether the sink device is in a power-ON state, hot-plug detection signals of +5 V from the 19-th pin when the voltage of +5 V is supplied to the 18-th pin.

CITATION LIST

Patent Literature 1: JP2011-239386A

SUMMARY OF INVENTION

As described above, both the sink devices illustrated in FIGS. 2 and 3 are configured to output, even in a power-OFF state, the hot-plug detection signals of +5 V to the source device when the voltage of +5 V is supplied from the source device. On the other hand, the source device has no function of detecting whether power is ON for the sink device to which it is connected. Consequently, in the sink devices illustrated in FIGS. 2 and 3, when connected to the source devices in the power-OFF state, the following problems may occur. The power-OFF state is not a waiting state (standby state) but a state where the sink device is not connected to any commercial AC power source.

First, a problem generated when the sink device illustrated in FIG. 2 is connected to the source device in the power-OFF state will be described.

The source device receives a hot-plug detection signal of +5 V from the sink device set in the power-OFF state, and reads EDID information from memory 102 in the sink device. In the sink device illustrated in FIG. 2, since the EDID information is stored in memory 102 that is a non-volatile memory, the source device can read the EDID information from memory 102 even when power is not ON for the sink device.

The source device, which has acquired the EDID information from the sink device that is in the power-OFF state, supplies a TMDS signal to the sink device that is in the power-OFF state. The supplying of the TMDS signal to the sink device that is in the power-OFF state may lead to leakage of current to the circuit of the sink device, thus causing an erroneous operation of the sink device.

Typically, HDMI receiver IC 130 has an erroneous operation prevention function. When power is ON for the sink device, due to an erroneous operation prevention function, any erroneous operation caused by the leaked current can be prevented. However, when power is not ON for the sink device as described above, the erroneous operation prevention function does not work. Thus, the erroneous operation caused by the leaked current is serious.

Next, a problem generated when the sink device illustrated in FIG. 3 is connected to the source device in the power-OFF state will be described.

The source device receives a hot-plug detection signal of +5 V from the sink device set in the power-OFF state, and executes access to EDID information 104 in the sink device. In the sink device illustrated in FIG. 3, since EDID information 104 is stored in HDMI receiver IC 103, when power is not ON for the sink device, the source device cannot access HDMI receiver IC 103, nor can it acquire EDID information 104.

When the EDID information cannot be acquired, the source device cannot recognize the function or the performance (format or resolution) of the sink device. Thus, the source device does not supply any TMDS signal to the sink device.

As described above, when the source device cannot acquire any EDID information after it has received the hot-plug detection signal of +5 V, the source device does not supply any TMDS signal to the sink device. Consequently, even when power is turned ON for the sink device, no video can be displayed by the sink device.

For example, when in the connected state of the source device and the sink device via the HDMI cable, power is turned ON for the sink device after power has been turned ON for the source device, as described above, the source device may not be able to acquire any EDID information of the sink device, nor may the sink device be able to display any videos.

The problems of the erroneous operation and the inhibited displaying of a video may also occur in the connected state of the sink device to the commercial AC power source and in the unactivated state of HDMI receiver IC 103 or the communication unit of HDMI receiver IC 103. The communication unit is a portion for receiving a signal from the source device via HDMI connector 101.

It is therefore an object of the present invention to provide an electronic device, a communication system, and a hot-plug control method that can solve the problems of the erroneous operation and prevented displaying of videos.

Solution to Problem

In order to achieve the object, according to an aspect of the present invention, there is provided an electronic device includes: a connector to which an external device is connected to via a signal cable and that includes at least first and second pins, a predetermined voltage being supplied from the external device to the first pin; a controller that includes a communication unit to which a signal is input from the external device via a pin other than the first and second pins of the connector and that outputs, when the communication unit is in an activated state, a first signal that indicates that the communication unit is in the activated state; and an output unit that outputs, when the first signal has not been output, a first detection signal indicating that a connection has not been established with the external device to the external device via the second pin.

According to another aspect of the present invention, there is provided a communication system that includes: a sink device that includes the electronic device according to any one of claims 1 to 16; and a source device to which the sink device is connected to via a communication cable, wherein the source device supplies a predetermined voltage to the sink device, and recognizes, when receiving a detection signal of the predetermined voltage from the sink device, that it is connected to the sink device.

According to yet another aspect of the present invention, there is provided a hot-plug control method implemented in an electronic device that includes a connector to which an external device is connected via a signal cable and that includes at least first and second pins, the method comprising: outputting, when a predetermined voltage has been supplied from the external device to the first pin in a state where a communication unit to which a signal is input from the external device via a pin other than the first and second pins of the connector is not activated, a first detection signal indicating that a connection has not been established with the external device to the external device via the second pin; and outputting, when the predetermined voltage has been supplied from the external device to the first pin in a state where the communication unit is activated, a signal of the predetermined voltage supplied to the first pin as a second detection signal to the external device via the second pin.

REFERENCE NUMERALS

11 HDMI connector
12 Memory
13 HDMI receiver IC
14 Switch circuit
15 to 17 Resistive element
18 N-type MOSFET
19 Transistor

DESCRIPTION OF EMBODIMENTS

The present invention is applied to an electronic device connected to an external device via a signal cable, particularly to an electronic device that receives a predetermined voltage from the external device to output a signal, indicating whether or not the electric and external devices are electrically connected to each other, to the external device. More specifically, the present invention is applied to a HDMI device equipped with an interface based on HDMI (High-Definition Multimedia Interface) Standard. The HDMI is a general standard concerning a communication interface for transmitting a video/audio through a digital signal, and is generally known. Thus, detailed description thereof will be omitted.

Hereinafter, the embodiments of the present invention will be described in detail by way of example of a HDMI device with reference to the drawings.

First Exemplary Embodiment

Figure 4:
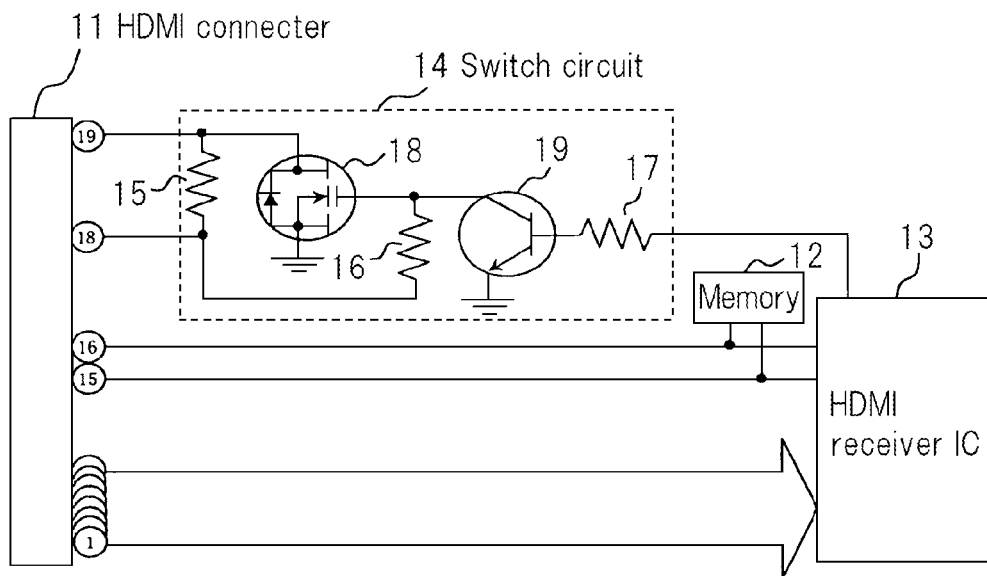
FIG. 4 A block diagram illustrating a configuration of a HDMI device according to a first exemplary embodiment of the present invention.

FIG. 4 is a block diagram illustrating the configuration of a HDMI device according to a first exemplary embodiment of the present invention.

The HDMI device illustrated in FIG. 4 is a sink device, for example, a monitor or a projector such as a HD (High Definition) television, and a main portion thereof includes HDMI connector 11, memory 12, HDMI receiver IC 13, and switch circuit 14.

Figure 2:
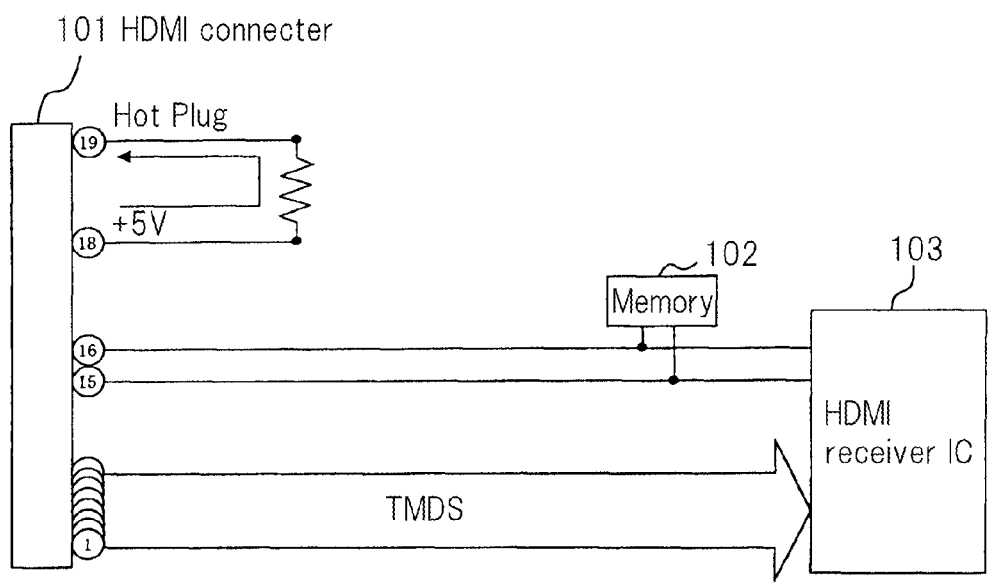
FIG. 2 A block diagram illustrating a configuration example of a sink device.
Figure 3:
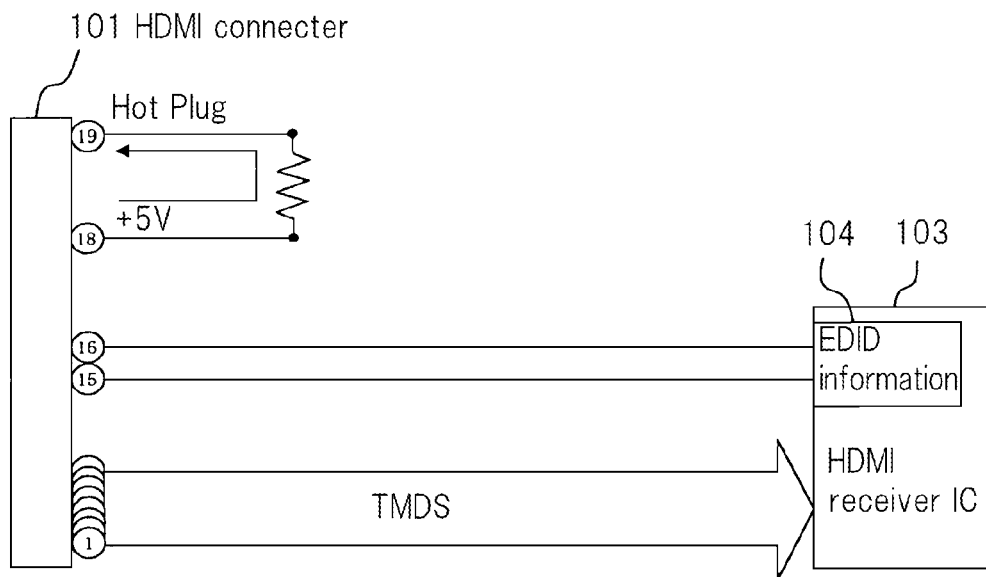
FIG. 3 A block diagram illustrating another configuration example of the sink device.

HDMI connector 11 and memory 12 are similar to HDMI connector 101 and memory 102 illustrated in FIG. 2. As HDMI connector 11, a connector other than a standard type, for example, a connector having 29 pins, may be used.

Switch circuit 14 outputs a signal of a voltage +5 V supplied to an 18-th pin as a hot-plug detection signal from a 19-th pin when a control signal is at a first level (high level), and outputs a signal of a voltage lower than +5 V (low level or ground potential) as a hot-plug detection signal from the 19-th pin when the control signal is at a second level (low level or ground potential).

Specifically, switch circuit 14 includes resistive elements 15 to 17, n-type MOSFET 18, and transistor 19.

Transistor 19 is a NPN transistor to which an emitter is grounded.

One end of resistive element 15 is connected to one end of resistive element 16, and to the 18-th pin of HDMI connector 11. The other end of resistive element 15 is connected to the drain of n-type MOSFET 18, and to the 19-th pin of HDMI connector 11. In place of the n-type MOSFET, a NPN transistor can be used. However, since the signal of the voltage +5 V supplied from the 18-th pin has a limit on the amount of current that can flow, it is more convenient to use the n-type MOSFET of small current consumption.

The other end of resistive element 16 is connected to the gate of n-type MOSFET 18, and to the collector of transistor 19. The source of n-type MOSFET 18 is grounded.

The base of transistor 19 is connected to the control signal output terminal of HDMI receiver IC 13 via resistive element 17.

The resistance value of resistive element 15 is a value of 1 kΩ based on the HDMI Standard. The resistance values of resistive elements 16 and 17 are both about 10 kΩ.

HDMI receiver IC 13 outputs a high-level control signal from the control signal output terminal while power is ON for the HDMI device. During a period other than the above period (state where power is not ON for HDMI device), the voltage of the control signal output terminal is at a low level (ground potential). This configuration can be achieved by using a switch element such as MOSFET. The period where the power is ON is a period where the sink device is connected to a commercial AC power source irrespective of the normal operating state or the standby state of the sink device.

Next, operation of the HDMI device according to the embodiment will be described.

Figure 5:
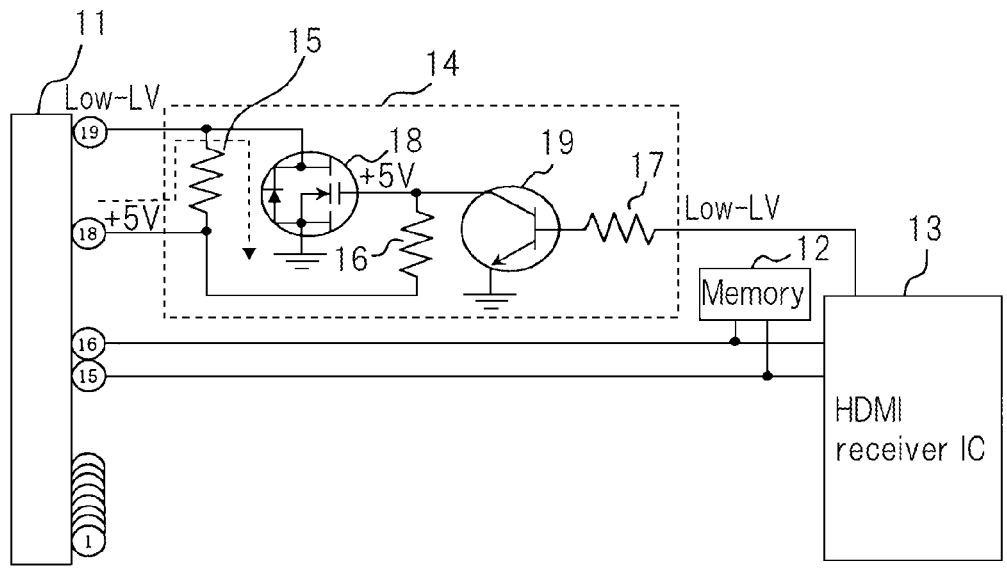
FIG. 5 A schematic diagram illustrating an operation in the power-OFF state of the HDMI device illustrated in FIG. 4.

FIG. 5 schematically illustrates an operation when a voltage of +5 V is supplied to the 18-th pin of HDMI connector 11 in the HDMI device that is in a power-OFF state.

As illustrated in FIG. 5, in the HDMI device that is in the power-OFF state, since HDMI receiver IC 13 is not activated, a low-level control signal is supplied to the base of transistor 19 via resistive element 17. Accordingly, transistor 19 is set in an OFF state.

When the voltage of +5 V is supplied to the 18-th pin of HDMI connector 11 in the OFF state of transistor 19, the voltage of +5 V is supplied to the gate of n-type MOSFET 18. Since the threshold voltage of n-type MOSFET 18 is lower than +5 V, n-type MOSFET 18 is set in the ON state.

In the ON state of n-type MOSFET 18, the 19-th pin is grounded via n-type MOSFET 18, and accordingly the voltage level of the 19-th pin is reduced to a low level. As a result, a hot-plug detection signal output from the 19-th pin is set to a low level.

When the hot-plug detection signal is at the low level, the source device does not recognize the HDMI device.

Figure 6:
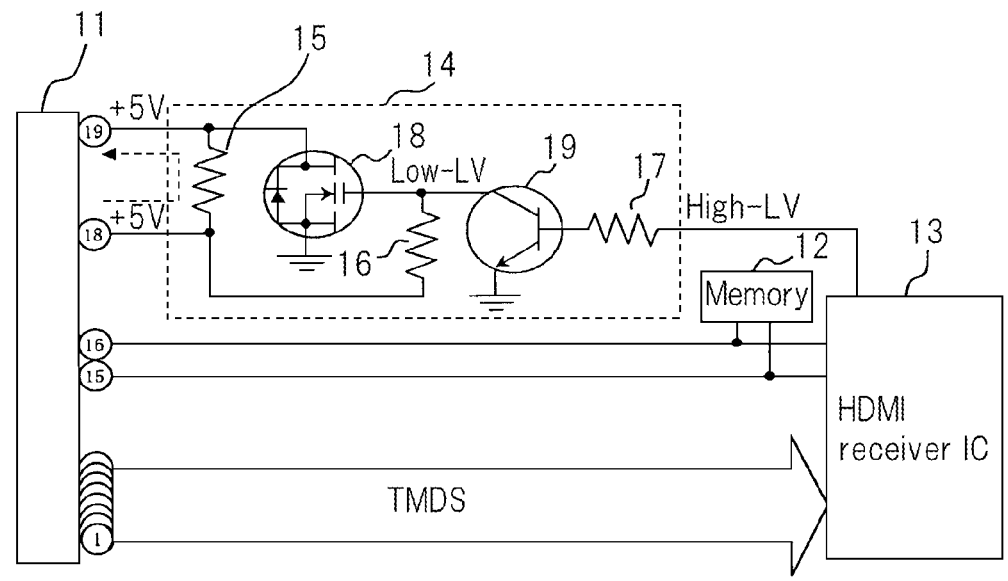
FIG. 6 A schematic diagram illustrating an operation in the power-ON state of the HDMI device illustrated in FIG. 4.

FIG. 6 schematically illustrates an operation when a voltage of +5 V is supplied to the 18-th pin of HDMI connector 11 in the HDMI device that is in a power-ON state.

As illustrated in FIG. 6, in the HDMI device that is in the power-ON state, HDMI receiver IC 13 supplies a high-level control signal to the base of transistor 19 via resistive element 17. Accordingly, transistor 19 is set to the ON state.

In the ON state of transistor 19, the gate of n-type MOSFET 18 is grounded via transistor 19. As a result, the voltage level of the gate of n-type MOSFET 18 is set to a level (low level) that is lower than the threshold voltage thereof, and n-type MOSFET 18 is set to the OFF state.

In the OFF state of n-type MOSFET 18, the 18-th and 19-th pins are simply connected to each other via resistive element 15, and a hot-plug detection signal of +5 V is output from the 19-th pin.

Figure 1:
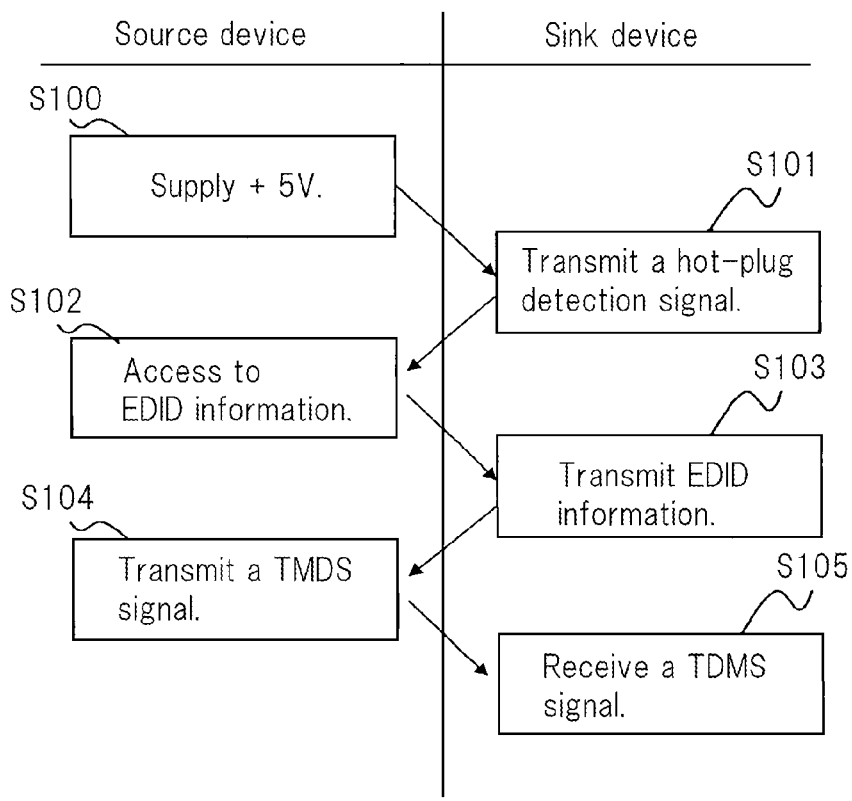
FIG. 1 A diagram illustrating an example of a HDMI signal transmission/reception sequence carried out in a communication system based on HDMI Standard.

The source device that has received the hot-plug detection signal of +5 V recognizes that it has been connected to the HDML device. Then, processing based on the procedure of steps S102 to S105 illustrated in FIG. 1 is performed between the source device and the HDMI device.

According to the HDMI device of the embodiment, when the HDMI device is connected to the source device in the power-OFF state, even if the voltage of +5 V is supplied to the 18-th pin of HDMI connector 11, the level of the hot-plug detection signal output from the 19-th pin is a low level. Thus, the source device does not recognize that it is connected to the HDMI device that is in the power-OFF state. As a result, no TMDS signal is supplied from the source device to the HDMI device of the power-OFF state, nor can the HDMI device be accidentally operated by leaked current that occurs when the TMDS signal is supplied.

Second Exemplary Embodiment

Figure 7:
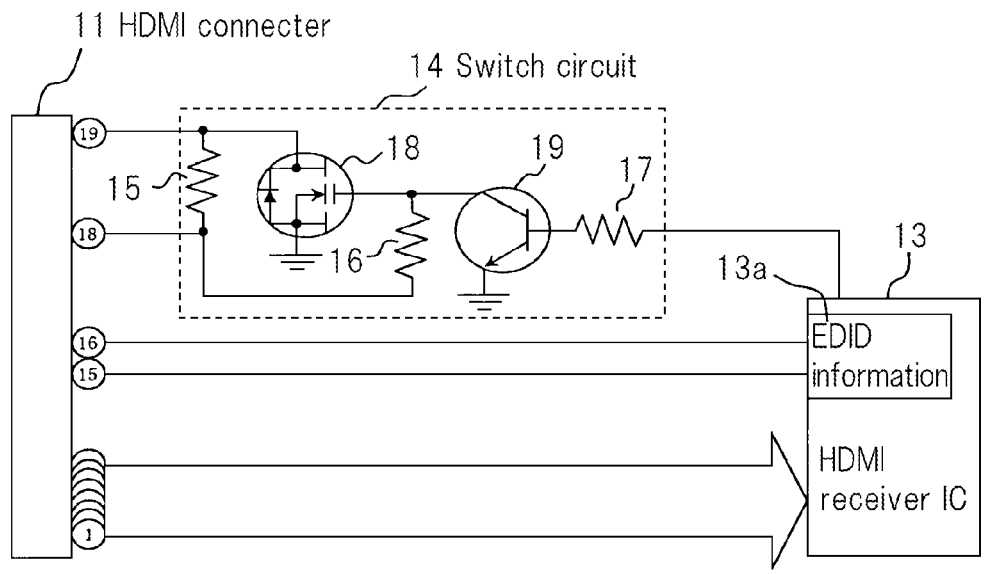
FIG. 7 A block diagram illustrating a configuration of a HDMI device according to a second exemplary embodiment of the present invention.

FIG. 7 is a block diagram illustrating the configuration of a HDMI device according to a second exemplary embodiment of the present invention.

The HDMI device according to the embodiment is configured such that memory 12 is removed from the HDMI device illustrated in FIG. 4, and HDMI receiver IC 13 stores EDID information 13a.

In the HDMI device according to the embodiment, HDMI receiver IC 13 receives access from a source device via the 15-th and 16-th pins of HDMI connector 11, and outputs EDID information 13a that it has stored from the 15-th and 16-th pins. Other operations are similar to those of the first embodiment.

In the HDMI device according to the embodiment, as in the case of the first embodiment, if it is connected to the source device in a power-OFF state, even when a voltage of +5 V is supplied to the 18-th pin of HDMI connector 11, the level of a hot-plug detection signal output from a 19-th pin is a low level. Thus, the source device does not recognize that it is connected to the HDMI device that is in a power-OFF state. As a result, the source device does not access the HDMI device that is in the power-OFF state to acquire EDID information.

In the HDMI device according to the embodiment, as in the case of the aforementioned arrangement, when power is ON, a +5 V hot-plug detection signal is output from the 19-th pin. The source device that has received the +5 V hot-plug detection signal recognizes that it is connected to the HDMI device, acquires EDID information from the HDMI device, and supplies a TMDS signal to the HDMI device. According to this operation, for example, when power is tuned ON for the HDMI device after the source device and the HDMI device in the power-OFF state have been connected to each other by a HDMI cable, the TMDS signal is supplied from the source device to the HDMI device. Accordingly, a video based on the TMDS signal is displayed on the HDMI device.

The aforementioned HDMI devices of the respective embodiments are only examples of the present invention, and changes understandable to those skilled in the art can be made to configurations and operations thereof without departing from the gist of the invention.

For example, in the HDMI devices illustrated in FIGS. 4 and 7, a control unit other than the HDMI receiver IC may supply the control signal to switch circuit 14. In this case, the control unit may be a control circuit to control the overall operation of the sink device.

Switch circuit 14 is not limited to the illustrated circuit. Any configuration can be employed as long as a signal of a voltage +5 V supplied to a first pin (e.g., 18-th pin) can be output as a hot-plug detection signal from a second pin (e.g., 19-th pin) when the control signal is at a first level (high level), and as long as a signal of a voltage (low level or ground potential) lower than +5 V can be output as a hot-plug detection signal from the second pin when the control signal is at a second level (low level). In place of a semiconductor switch such as a MOSFET or a transistor, a mechanical switch such as a relay may be used. In such a case, using a latch relay enables power consumption to be reduced to 0, and is convenient.

Third Exemplary Embodiment

Figure 8:
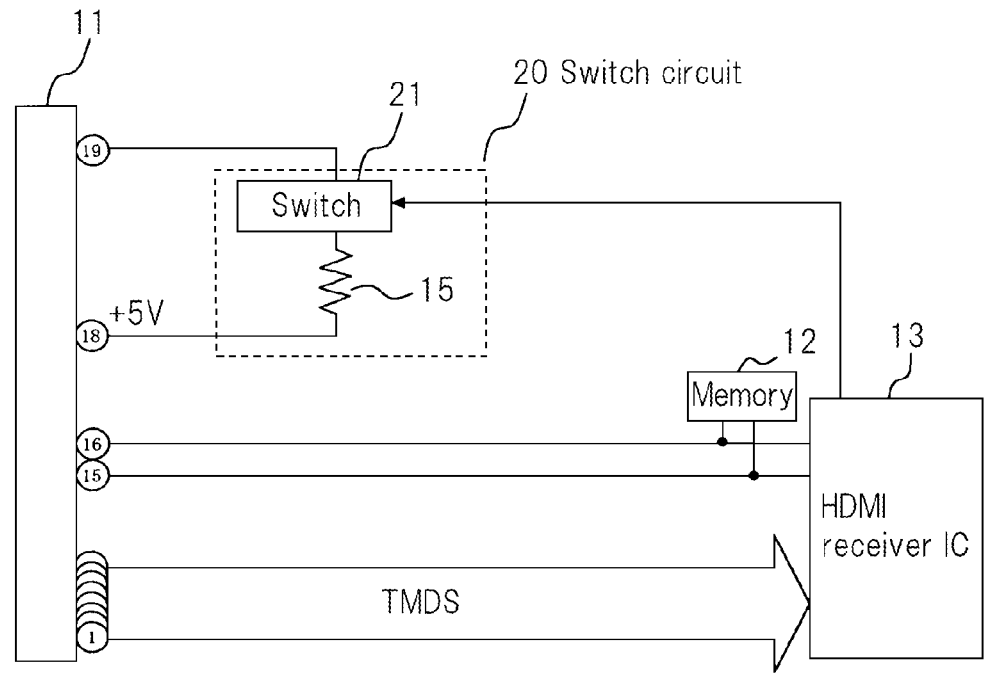
FIG. 8 A block diagram illustrating a configuration of a HDMI device according to a third exemplary embodiment of the present invention.

FIG. 8 is a block diagram illustrating the configuration of a HDMI device according to a third exemplary embodiment of the present invention.

The HDMI device illustrated in FIG. 8 uses switch circuit 20 in place of switch circuit 14 of the HDMI device illustrated in FIG. 4. HDMI connector 11, memory 12, and HDMI receiver IC 13 are similar to those illustrated in FIG. 4.

In the HDMI device illustrated in FIG. 4, switch circuit 14 includes a switch between the second pin (e.g., 19-th pin) for hot-plug detection and the ground potential. On the other hand, in this embodiment, switch circuit 20 includes a switch between a first pin (e.g., 18-th pin) to supply a voltage +5 V and a second pin (e.g., 19-th pin) for hot-plug detection.

Switch circuit 20 includes resistive element 15 and switch 21. Switch 21 is a semiconductor switch or a mechanical switch such as a relay. The semiconductor switch can be configured by a transistor or a FET, or a combination thereof.

When a control signal is at a first level (high level), switch 21 is turned ON to set a shortcircuited state between the 18-th pin and the 19-th pin via resistive element 15. In this case, the signal of a voltage +5 V supplied to the 18-th pin is output as a hot-plug detection signal from the 19-th pin via resistive element 15. Accordingly, a source device detects that the hot-plug detection signal is at a high level, and recognizes the HDMI device that is a sink device.

On the other hand, when the control signal is at a second level (low level or ground potential), switch 21 is turned OFF to set a released state (high impedance state) between the 18-th pin and the 19-th pin. In this case, since no voltage +5 V is supplied to the 19-th pin, the source device does not recognize the HDMI device that is the sink device.

Figure 9:
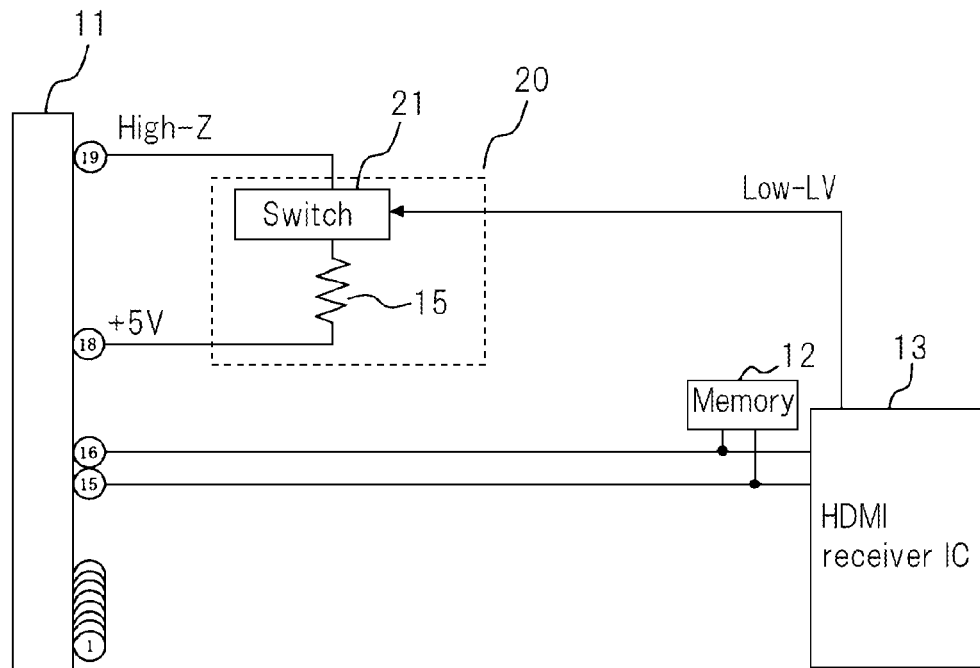
FIG. 9 A schematic diagram illustrating an operation in the power-OFF state of the HDMI device illustrated in FIG. 8.

FIG. 9 illustrates a state when power is OFF for the HDMI device. Since the control signal is at the second level (low level), switch 21 is set in a released state. In this case, since the signal of the voltage +5 V supplied to the 18-th pin is not output as a hot-plug detection signal from the 19-th pin via resistive element 15, the source device does not recognize the HDMI device that is the sink device.

Figure 10:
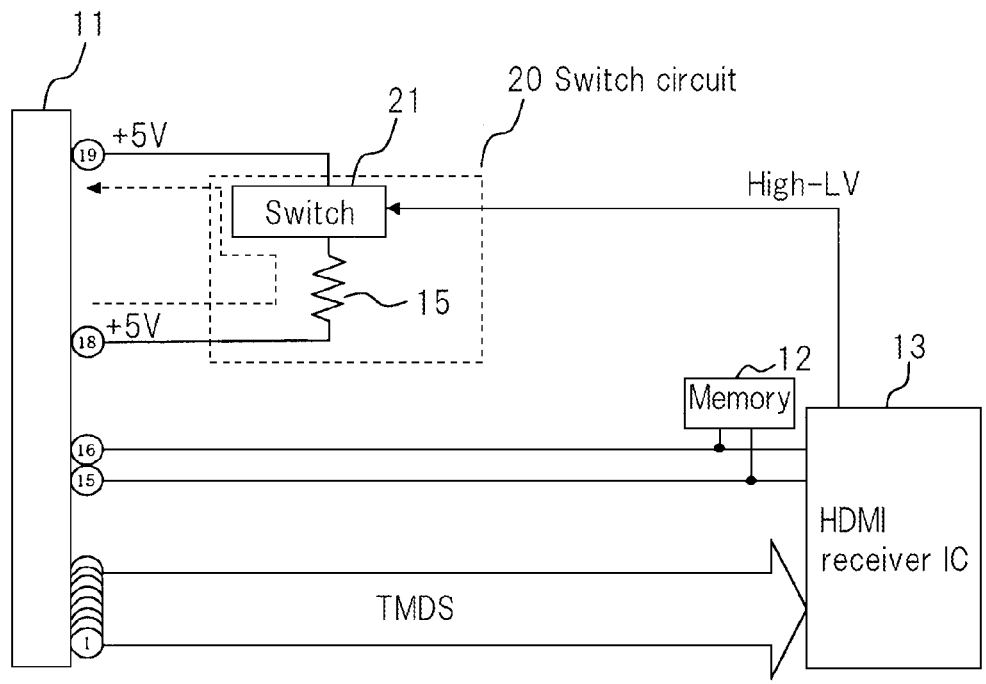
FIG. 10 A schematic diagram illustrating an operation in the power-ON state of the HDMI device illustrated in FIG. 8.

FIG. 10 illustrates the power-ON state of the HDMI device. Since the control signal is at the first level (high level), switch 21 is set in a shortcircuited state, and the signal of the voltage +5 V supplied to the 18-th pin is supplied to, as a hot-plug detection signal, the 19-th pin via resistive element 15. The source device can recognize the HDMI device on the basis of the hot-plug detection signal output from the 19-th pin.

Switch circuit 20 may be configured by a mechanical switch such as a relay.

Figure 11:
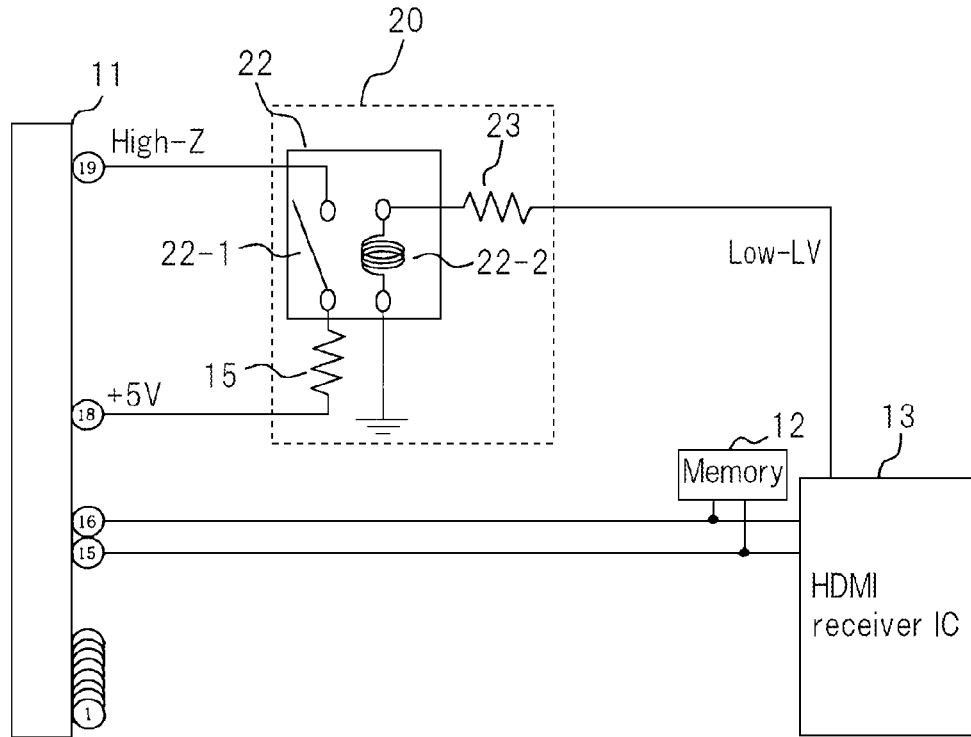
FIG. 11 A diagram illustrating a modified example of the HDMI device according to the third exemplary embodiment of the present invention.
Figure 12:
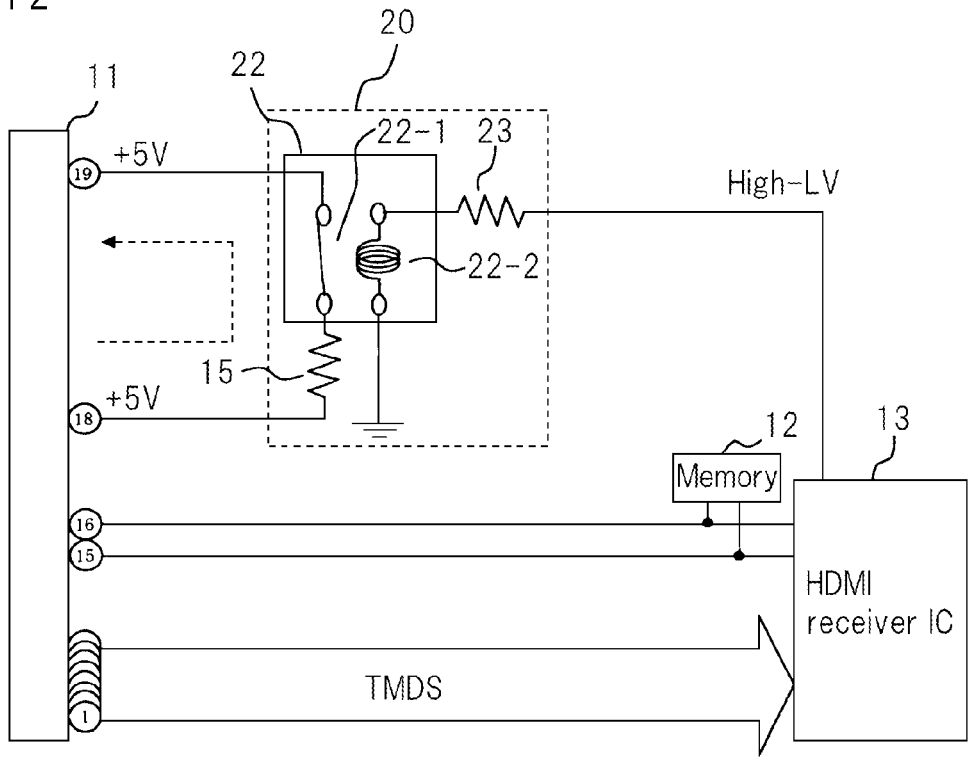
FIG. 12 A diagram illustrating a modified example of the HDMI device according to the third exemplary embodiment of the present invention.

FIGS. 11 and 12 illustrate examples when switch circuit 20 is configured by a mechanical relay. Switch circuit 20 includes resistive elements 15 and 23 and relay 22. Relay 22 includes contact 22-1 and coil 22-2. Coil 22-2 includes, for example, an exciting coil. The flow of current through coil 22-2 sets contact 22-1 in an ON state. When no current flows through coil 22-2, contact 22-1 is set in an OFF state.

One terminal of contact 22-1 is connected to the 18-th pin via resistive element 15, and the other terminal of contact 22-1 is connected to the 19-th pin. One end of coil 22-2 is grounded, and the other end of contact 22-2 is connected to one end of resistive element 23. The control signal is supplied to the other end of resistive element 23.

FIG. 11 illustrates a state when power is OFF for the HDMI device. Since the control signal is at the second level (low level), contact 22-1 is set in a released state. In this case, since the released state (high impedance state) is set between the 18-th and 19-th pins, the signal of the voltage +5 V supplied to the 18-th pin is not output as a hot-plug detection signal from the 19-th pin via resistive element 15. Accordingly, the source device does not recognize the HDMI device that is the sink device.

FIG. 12 illustrates the power-ON state of the HDMI device. Since the control signal is at the first level (high level), contact 22-1 is set in a shortcircuited state, and the signal of the voltage +5 V supplied to the 18-th pin is supplied to, as a hot-plug detection signal, the 19-th pin via resistive element 15. The source device can recognize the HDMI device on the basis of the hot-plug detection signal output from the 19-th pin.

According to the HDMI device of the embodiment, when the HDMI device is connected to the source device in the power-OFF state, since no voltage of +5 V is supplied to the 18-th pin of HDMI connector 11, the level of the hot-plug detection signal output from the 19-th pin is not at a high level. Thus, the source device does not recognize that it is connected to the HDMI device that is in the power-OFF state. As a result, no TMDS signal is supplied from the source device to the HDMI device in the power-OFF state, nor can the HDMI device be accidentally operated by leaked current that occurs when the TMDS signal is supplied.

In the HDMI device according to the embodiment, as in the case of the first and second embodiments, a latch relay among mechanical relays may be used as a switch circuit. In this case, since a control voltage needs to be supplied only when a shortcircuited state between the terminals and a released state between the terminals are switched, lower power consumption can be achieved.

In the HDMI device according to the embodiment, as in the aforementioned case, a control unit other than the HDMI receiver IC may supply the control signal to switch circuit 20. In this case, for example, the control unit may be a control circuit for controlling the overall operation of the sink device.

In the HDMI device according to the embodiment, as in the aforementioned case, memory 12 may be removed, and HDMI receiver IC 13 may be accessed from the source device via the 15-th and 16-th pins of HDMI connector 11, and may output EDID information 13a that it has stored from the 15-th and 16-th pins.

Fourth Exemplary Embodiment

Figure 13:
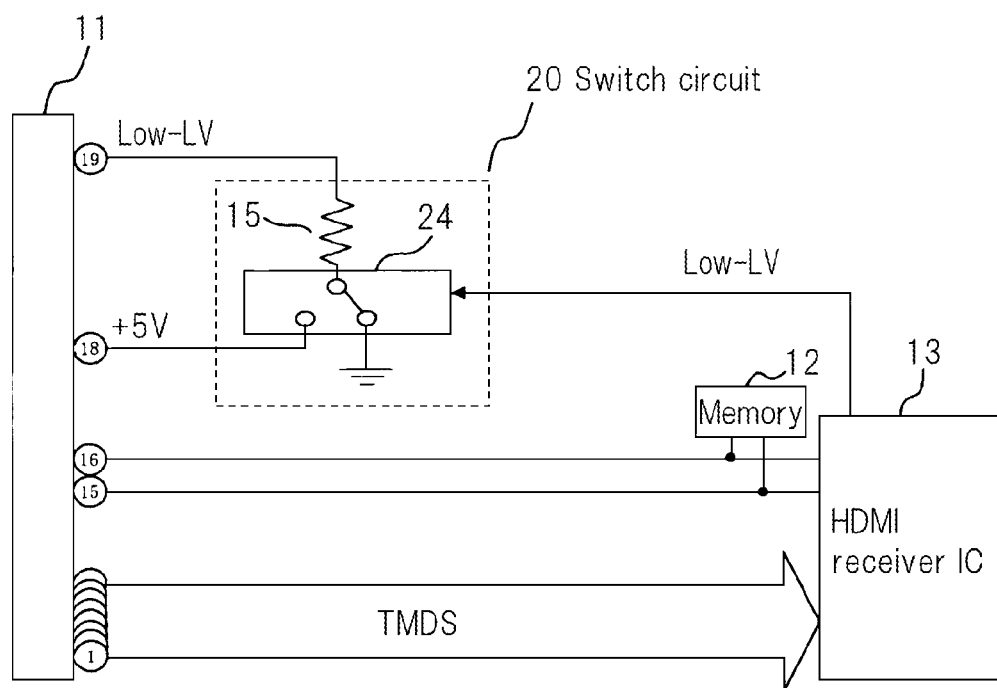
FIG. 13 A block diagram illustrating a configuration of a HDMI device according to a fourth exemplary embodiment of the present invention.

FIG. 13 is a block diagram illustrating the configuration of a HDMI device according to a fourth exemplary embodiment of the present invention.

The HDMI device illustrated in FIG. 13 is similar in configuration to the HDMI device illustrated in FIG. 8 except for the inclusion of switch 24 in place of switch 21 of switch circuit 20.

Switch 24 is a mechanical switch such as a semiconductor switch or a relay. The semiconductor switch can be configured by a transistor or a FET, or a combination thereof.

Switch 24 includes first to third terminals. The first terminal is connected to a 19-th pin via resistive element 15. The second terminal is connected to an 18-th pin, and the third terminal is grounded.

Switch 24 performs switching between a first state where the first and second terminals are connected and a second state where the first and third terminals are connected according to a control signal from HDMI receiver IC 13.

When the control signal is at a first level (high level), switch 24 is set in the first state to set a shortcircuited state between the 18-th pin and the 19-th pin via resistive element 15. In this case, the signal of a voltage +5 V supplied to the 18-th pin is output as a hot-plug detection signal from the 19-th pin via resistive element 15. Accordingly, a source device detects that the hot-plug detection signal is a high level, and recognizes the HDMI device that is a sink device.

On the other hand, when the control signal is at a second level (low level or ground potential), switch 24 is set in the second state to set the 19-th pin in a grounded state via resistive element 15. In this case, since no voltage +5 V is supplied to the 19-th pin, the source device cannot recognize the HDMI device that is the sink device.

The HDMI device according to the embodiment provides the following operation effects.

Since the 19-th pin is connected to the input of the detection circuit or the like of the source device via a signal cable, when the 19-th pin is set in a released state (high impedance state), external disturbance noise or the like may be input to the source device via the signal line of the 19-th pin, thereby causing the source device to accidentally operate. According to the HDMI device of the embodiment, since the 19-th pin is connected to the 18-th pin or a GND (ground) via resistive element 15, the 19-th pin is not set in the released state. As a result, it is difficult to be affected by the noise.

When the 19-th pin is directly connected to the GND (ground), depending on the circuit configuration of the source device, an erroneous operation may occur. According to the HDMI device according to the embodiment, since the 19-th pin is connected to the GND (ground) via resistive element 15 (resistance value is, for example, 1 kW, such an erroneous operation can be prevented.

In the HDMI device of the embodiment, memory 12 may be removed, and HDMI receiver IC 13 may be accessed from the source device via the 15-th and 16-th pins of HDMI connector 11, and may output EDID information 13a that it has stored from the 15-th and 16-th pins.

According to each of the aforementioned embodiments, HDMI receiver IC 13 outputs a high-level control signal from the control signal output terminal while power is ON for the HDMI device, and during a period other than the above (state where power is not ON for HDMI device), the voltage of the control signal output terminal is at a low level (ground potential). Instead of this construction, the high-level control signal may be output from the control signal output terminal while HDMI receiver IC 13 or the communication unit of HDMI receiver IC 13 is activated, and during a period other than the above, the voltage of the control signal output terminal may be at a low level (ground potential). In the case of the communication unit of HDMI receiver IC 13, for example, even when HDMI receiver IC 13 has no erroneous operation prevention function, an erroneous operation can be prevented. For example, the communication unit of HDMI receiver IC 13 receives a video signal, an audio signal, a clock signal and/or a control signal transmitted from an external device (source device) via connector 11. When HDMI receiver IC 13 stores EDID information 13a, the communication unit of HDMI receiver IC 13 may include EDID information 13a. The state where HDMI receiver IC 13 or the communication unit of HDMI receiver IC 13 is activated is, for example, a state where power is ON for HDMI receiver IC 13 or the communication unit of HDMI receiver IC 13, a state where initialization of HDMI receiver IC 13 or the communication unit of HDMI receiver IC 13 has been completed, or a state where preparation for communication of HDMI receiver IC 13 or the communication unit of HDMI receiver IC 13 with the source device that is the external device has been completed.

The aforementioned embodiments are examples of the present invention, and various changes understandable to those skilled in the art can be made to the configuration and the operation of the present invention without departing from the scope of the invention.

The present invention can employ the following forms. However, the forms are in no way limitative of the invention.

APPENDIX 1

An electronic device comprising:
a connector to which an external device is connected to via a signal cable and that includes at least first and second pins, a predetermined voltage being supplied from the external device to the first pin;
a controller that includes a communication unit to which a signal is input from the external device via a pin other than the first and second pins of the connector and that outputs, when the communication unit is in an activated state, a first signal that indicates that the communication unit is in the activated state; and
an output unit that outputs, when the first signal has not been output, a first detection signal indicating that a connection has not been established with the external device to the external device via the second pin.

APPENDIX 2

The electronic device according to appendix 1, wherein the output unit outputs, when the first signal has not been output, a low level or a ground potential as the first detection signal.

APPENDIX 3

The electronic device according to appendix 2, wherein the output unit includes a switch to which the first signal is input as a control signal and that sets the second pin to a low level or a ground potential during a period where the first signal is not input.

APPENDIX 4

The electronic device according to appendix 3, wherein:
the switch includes first to third resistive elements, a MOSFET, and a transistor;
an emitter of the transistor and a source of the MOSFET are grounded;
one end of the first resistive element is connected to one end of the second resistive element, and connected to the first pin of the connector;
the other end of the first resistive element is connected to a drain of the MOSFET, and connected to the second pin of the connector;
the other end of the second resistive element is connected to a gate of the MOSFET, and connected to a collector of the transistor;
the first signal is supplied to a base of the transistor via the third resistive element;
during the period where the first signal is not output, the transistor is turned OFF while the MOSFET is turned ON; and
during a period where the first signal is output, the transistor is turned ON while the MOSFET is turned OFF.

APPENDIX 5

The electronic device according to appendix 3, wherein:
the switch includes a resistive element and a switch element;
the switch element includes first to third terminals, the first terminal being connected to the first pin of the connector, the second terminal being grounded, and the third terminal being connected to the second pin of the connector via the resistive element; and
during a period where the first signal is output, the first and third terminals of the switch element are connected; and
during the period where the first signal is not output, the second and third terminals of the switch element are connected.

APPENDIX 6

The electronic device according to appendix 1, wherein the output unit outputs, when the first signal has not been output, the first detection signal by releasing the second pin.

APPENDIX 7

The electronic device according to appendix 6, wherein the output unit sets, when the first signal has not been output, a released state between the first pin and the second pin.

APPENDIX 8

The electronic device according to appendix 7, wherein:
the output unit includes a switch to which the first signal is input as a control signal and a resistive element;
the first pin is connected to one end of the switch via the resistive element, and the second pin is connected to the other end of the switch element; and
the switch sets the released state between the first pin and the second pin during a period where the first signal is not output.

APPENDIX 9

The electronic device according to appendix 7, wherein:

the output unit includes a relay to which the first signal is input as a control signal and first and second resistive elements;

the first pin is connected to one terminal of the relay via the first resistive element, and the second pin is connected to a terminal of the other end of the relay; and the relay sets the released state between the first pin and the second pin during a period where the first signal is not output.

APPENDIX 10

The electronic device according to appendix 7, wherein:

the switch includes a resistive element and a switch element;

one end of the resistive element is connected to the first pin of the connector, and the other end of the resistive element is connected to the second pin of the connector via the switch element;

during a period where the first signal is output, the switch element is turned ON; and during the period where the first signal is not output, the switch element is turned OFF.

APPENDIX 11

The electronic device according to any one of appendixes 1 to 10, wherein when the first signal has been output, the output unit outputs a second detection signal indicating that a connection has not been established with the external device to the external device via the second pin.

APPENDIX 12

The electronic device according to appendix 11, wherein during the period where the first signal is output, the output unit outputs the signal of the predetermined voltage supplied to the first pin as the second detection signal from the second pin.

APPENDIX 13

The electronic device according to any one of appendixes 1 to 12, further comprising a nonvolatile memory that stores identification data indicating that resolution and a format of a video/audio signal, wherein the connector further includes a pin by which the external device reads the identification data from the nonvolatile memory.

APPENDIX 14

The electronic device according to any one of appendixes 1 to 12, wherein:

the control units stores identification data indicating that resolution and a format of a video/audio signal; and the connector further includes a pin by which the external device accesses the control unit to acquire the identification data.

APPENDIX 15

The electronic device according to any one of appendixes 1 to 14, wherein the activated state of the communication unit is a power-ON state of the communication unit.

APPENDIX 16

The electronic device according to any one of appendixes 1 to 14, wherein the activated state of the communication unit is an initialization-completed state of the communication unit.

APPENDIX 17

A communication system comprising:

a sink device that includes the electronic device according to any one of claims 1 to 16; and a source device to which the sink device is connected to via a communication cable, wherein the source device supplies a predetermined voltage to the sink device, and recognizes, when receiving a detection signal of the predetermined voltage from the sink device, that it is connected to the sink device.

APPENDIX 18

A hot-plug control method implemented in an electronic device that includes a connector to which an external device is connected via a signal cable and that includes at least first and second pins, the method comprising:

outputting, when a predetermined voltage has been supplied from the external device to the first pin in a state where a communication unit to which a signal is input from the external device via a pin other than the first and second pins of the connector is not activated, a first detection signal indicating that a connection has not been established with the external device to the external device via the second pin; and outputting, when the predetermined voltage has been supplied from the external device to the first pin in a state where the communication unit is activated, a signal of the predetermined voltage supplied to the first pin as a second detection signal to the external device via the second pin.

In the forms of the appendixes 1 to 18, the control unit is the HDMI receiver IC or the like according to the first to fourth embodiments. HDMI receiver IC 13 is an example of the control unit. The connector and the output unit are respectively the HDMI connector and the switch circuit according to the first to fourth embodiments.

The detection signal indicating the connection established with the external device and output from the second pin may be generated by using a predetermined voltage supplied to the first pin.

This application claims priority from PCT/JP2012/74555 filed Sep. 25, 2012, and Taiwan Patent No. 101136805 filed Oct. 5, 2012, which are hereby incorporated by reference herein in their entirety.

The invention claimed is:

1. An electronic device, comprising:
a connector to which an external device is connected to via a signal cable and that includes at least first and second pins, a predetermined voltage being supplied from the external device to the first pin;
a controller that includes a communication unit to which a signal is input from the external device via a pin other than the first and second pins of the connector and that outputs, when the communication unit is in an activated state, a first signal that indicates that the communication unit is in the activated state; and an output unit that outputs to the external device via the second pin, when the first signal has not been outputted by the controller, a first detection signal indicating that a connection of the communication device has not been established with the external device.

2. The electronic device according to claim 1, wherein the output unit outputs, when the first signal has not been output, a low level or a ground potential as the first detection signal.

3. The electronic device according to claim 2, wherein the output unit includes a switch to which the first signal is input as a control signal and that sets the second pin to a low level or a ground potential during a period where the first signal is not input.

4. The electronic device according to claim 3, wherein the switch includes first to third resistive elements, a MOSFET, and a transistor;
wherein an emitter of the transistor and a source of the MOSFET are grounded,
wherein one end of the first resistive element is connected to one end of the second resistive element, and connected to the first pin of the connector,
wherein another end of the first resistive element is connected to a drain of the MOSFET, and connected to the second pin of the connector,
wherein another end of the second resistive element is connected to a gate of the MOSFET, and connected to a collector of the transistor,
wherein the first signal is supplied to a base of the transistor via the third resistive element,
wherein, during a period where the first signal is not output, the transistor is turned OFF while the MOSFET is turned ON, and
wherein, during a period where the first signal is output, the transistor is turned ON while the MOSFET is turned OFF.

5. The electronic device according to claim 3, wherein the switch includes a resistive element and a switch element,
wherein the switch element includes first to third terminals, the first terminal being connected to the first pin of the connector, the second terminal being grounded, and the third terminal being connected to the second pin of the connector via the resistive element,
wherein, during a period where the first signal is output, the first and third terminals of the switch element are connected, and
wherein, during the period where the first signal is not output, the second and third terminals of the switch element are connected.

6. The electronic device according to claim 1, wherein the output unit outputs, when the first signal has not been outputted by the controller, the first detection signal by setting the second pin in an electrically open state.

7. The electronic device according to claim 6, wherein the output unit sets, when the first signal has not been outputted by the controller, the electrically open state between the first pin and the second pin.

8. The electronic device according to claim 7, wherein the output unit includes a switch to which the first signal is input as a control signal and a resistive element,
wherein the first pin is connected to one end of the switch via the resistive element, and the second pin is connected to another end of the switch, and
wherein the switch sets the electrically open state between the first pin and the second pin during a period where the first signal is not output.

9. The electronic device according to claim 7, wherein the output unit includes a relay to which the first signal is input as a control signal and first and second resistive elements,
wherein the first pin is connected to one terminal of the relay via the first resistive element, and the second pin is connected to a terminal of another end of the relay, and
wherein the relay sets the electrically open state between the first pin and the second pin during a period where the first signal is not output.

10. The electronic device according to claim 7, wherein the switch includes a resistive element and a switch element,
wherein one end of the resistive element is connected to the first pin of the connector, and another end of the resistive element is connected to the second pin of the connector via the switch element,
wherein, during a period where the first signal is output, the switch element is turned ON, and
wherein, during the period where the first signal is not output, the switch element is turned OFF.

11. The electronic device according to claim 1, wherein, when the first signal has been outputted by the controller, the output unit outputs to the external device, via the second pin, a second detection signal indicating that a connection of the communication device in the inactivated state has not been established with the external device.

12. The electronic device according to claim 11, wherein, during a period where the first signal is output, the output unit outputs the signal of the predetermined voltage supplied to the first pin as the second detection signal from the second pin.

13. The electronic device according to claim 1, further comprising a nonvolatile memory that stores identification data indicating a resolution and a format of a video/audio signal,
wherein the connector further includes a pin by which the external device reads the identification data from the nonvolatile memory.

14. The electronic device according to claim 1, wherein the control units stores identification data indicating a resolution and a format of a video/audio signal, and
wherein the connector further includes a pin by which the external device accesses the control unit to acquire the identification data.

15. The electronic device according to claim 1, wherein the activated state of the communication unit includes a power-ON state of the communication unit.

16. The electronic device according to claim 1, wherein the activated state of the communication unit includes an initialization-completed state of the communication unit.

17. A communication system, comprising:
a sink device that includes the electronic device according to claim 1; and
a source device that includes the external device to which the sink device is connected to via a communication cable that includes the signal cable,
wherein the source device supplies the predetermined voltage to the sink device, and recognizes, when receiving a detection signal of the predetermined voltage from the sink device, that it is connected to the sink device.

18. A hot-plug control method implemented in an electronic device that includes a connector to which an external device is connected via a signal cable and that includes at least first and second pins, the method comprising:

when a predetermined voltage has been supplied from the external device to the first pin in a state where a communication unit is not activated, in which a signal is inputted to the communication unit from the external device via a pin other than the first and second pins of the connector, outputting to the external device, via the second pin, a first detection signal indicating that a connection of the communication unit has not been established with the external device; and when the predetermined voltage has been supplied from the external device to the first pin, in a state where the communication unit is activated, outputting to the external device, via the second pin, a signal of the predetermined voltage supplied to the first pin as a second detection signal.

19. The electronic device according to claim 1, wherein, when the first signal has not been outputted by the controller, the communication unit is not in the activated state.

20. The electronic device according to claim 1, wherein, based on the first detection signal, when the external device recognizes that it is not connected to the electronic device, the external device does not carry out an access operation to access the electronic device.

* * * * *